Aug. 8, 1933.  W. F. STIMPSON ET AL  1,921,848
TEMPERATURE COMPENSATING MEANS FOR WEIGHING SCALES
Original Filed Oct. 31, 1928  3 Sheets-Sheet 3
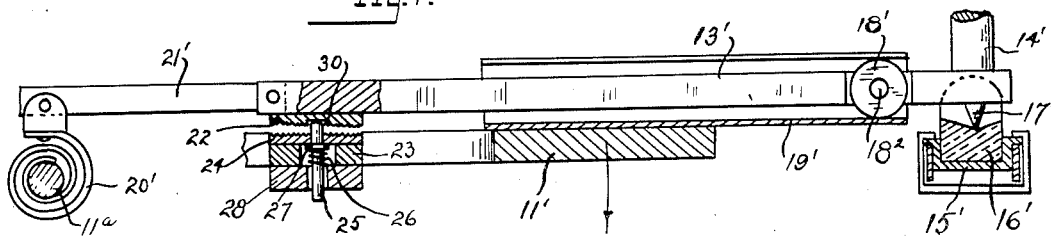
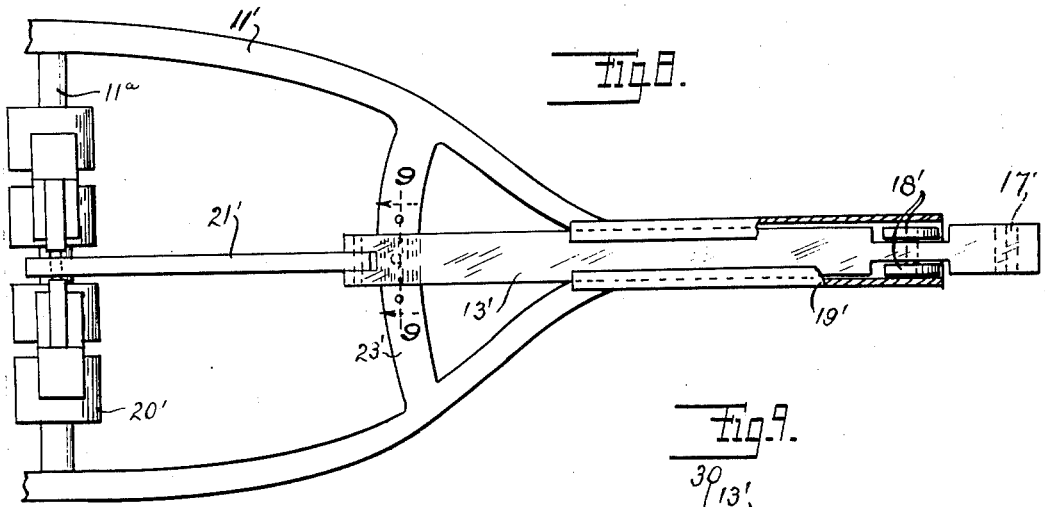
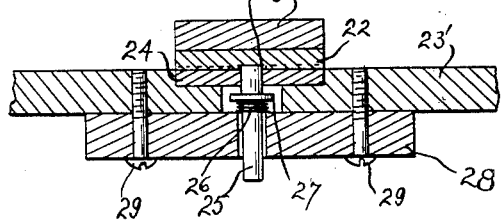
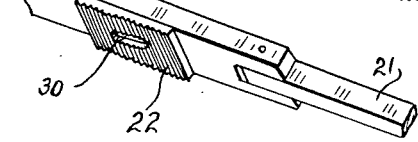
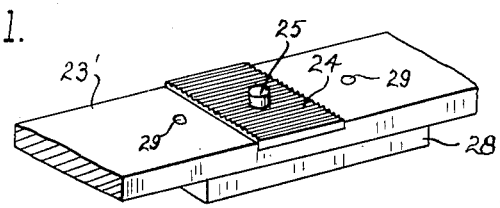
INVENTORS
Walter F. Stimpson
Willis E. Finch
BY Swan + Frye
ATTORNEYS Patented Aug. 8, 1933

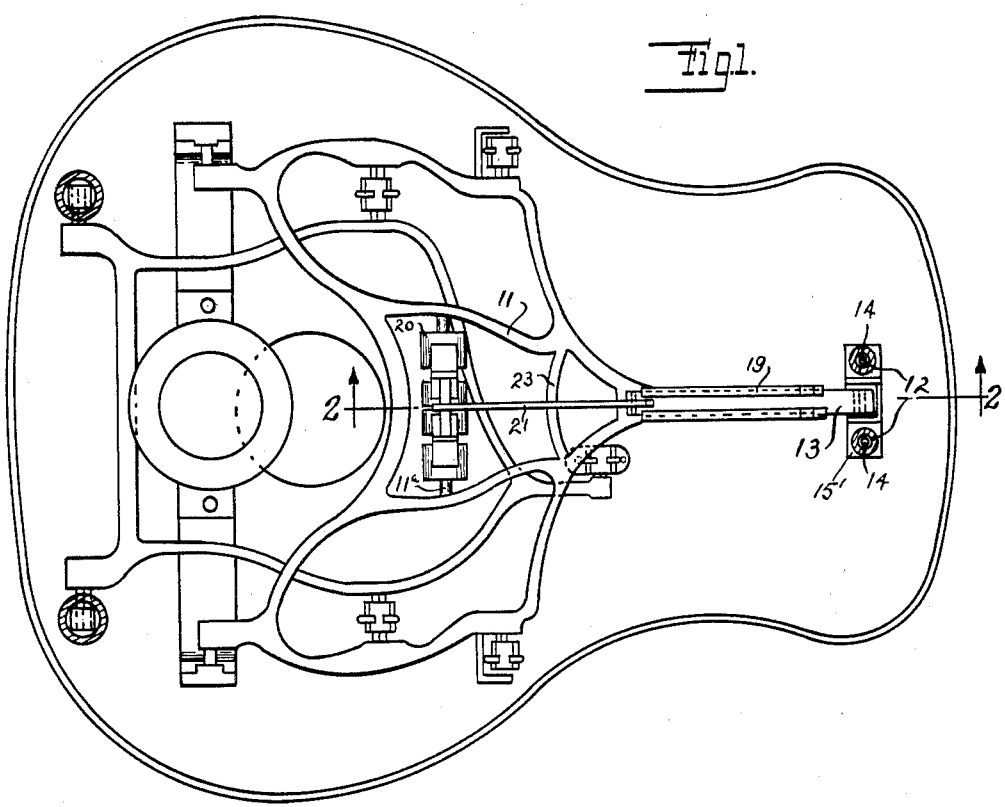
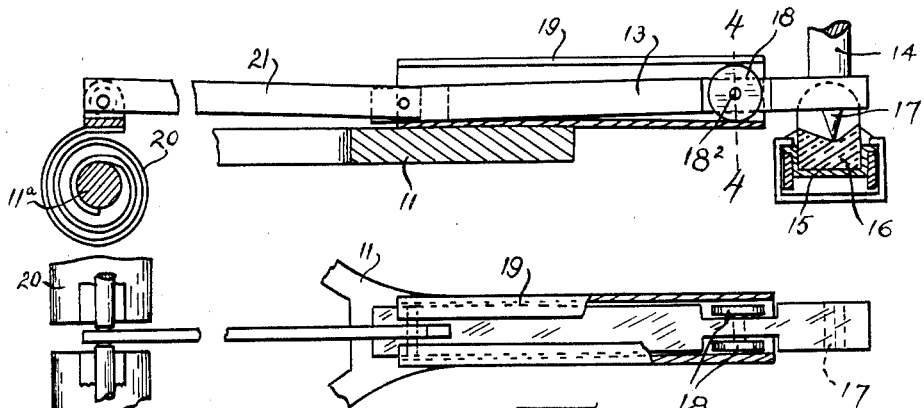
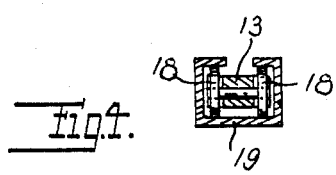

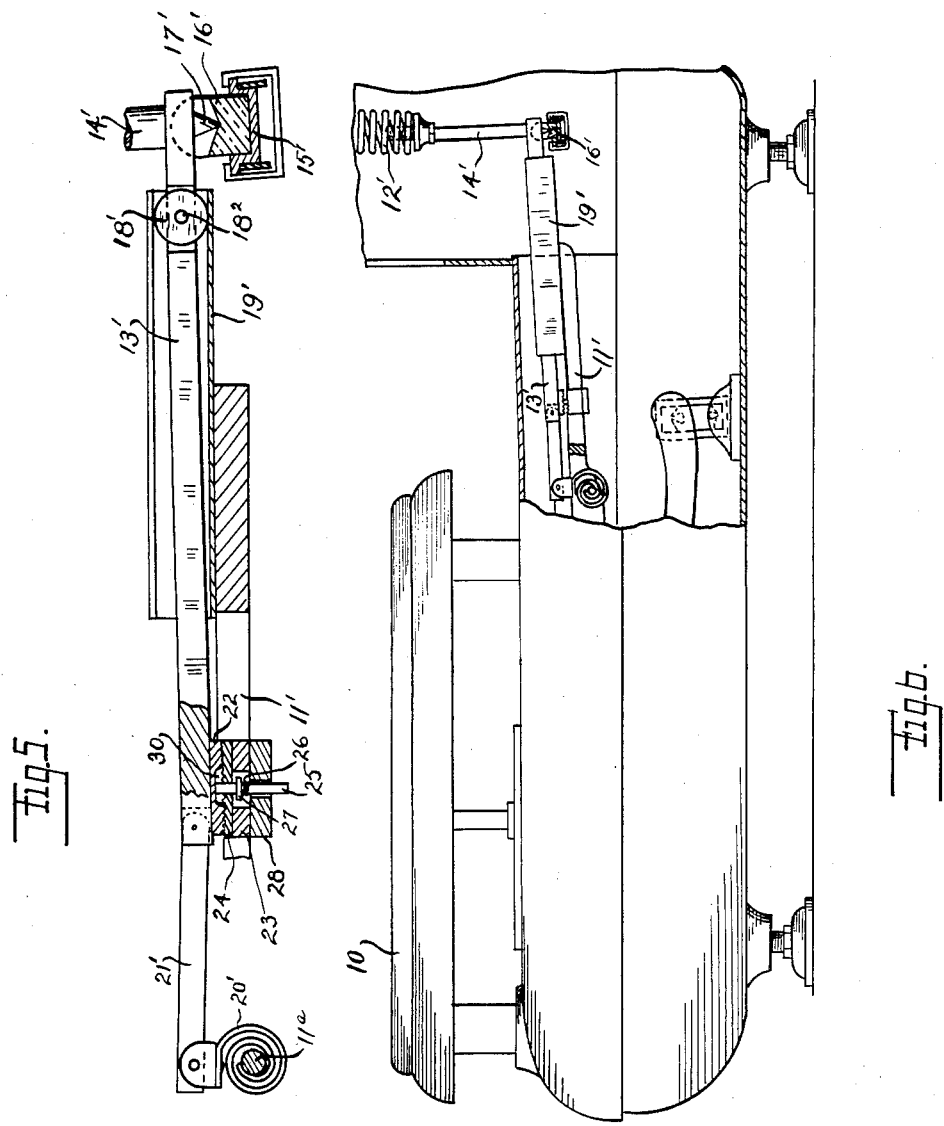

1,921,848

UNITED STATES PATENT OFFICE 1,921,848

TEMPERATURE COMPENSATING MEANS FOR WEIGHING SCALES

Walter F. Stimpson, Detroit, Mich., and Willis E. Finch, Bareville, Pa.; said Finch assignor to said Stimpson Continuation of application Serial No. 316,123, October 31, 1928. This application August 7, 1931. Serial No. 555,690

12 Claims. (Cl. 265—69)

This invention relates to weighing scales, and more particularly to temperature compensating means therefor, and the present application is a continuation of our previously filed copending application, Serial No. 316,123, filed October 31, 1928.

In scales employing springs as load-counterbalancing means, the expansion and contraction of the springs which results from varying temperatures must be counteracted if the scale is to remain accurate despite such expansion and contraction. It is common to provide thermostatically controlled means for varying the effective length of one of the levers or some other portion of the mechanism for this purpose. One trouble frequently arising in connection with the application of such an arrangement to this purpose is the difficulty in positively locking the thermostatically controlled elements in a manner to prevent movement thereof under any other influence than that of changing temperature. Since of necessity the parts must be freely movable when actuated by the thermostat under normal conditions, the load placed on the scale platform is apt to cause undesired movement of these parts unless positive locking means is provided. It is an object of our invention to provide such a positive locking means which will be very simple and effective in operation, and will not interfere with the freedom of operation of the thermostat when no load, or only a relatively light load, is on the platform of the scale, but which will absolutely prevent undesired movement of the thermostat and the elements controlled by it, no matter what load, within the capacity of the scale, may be placed upon the platform.

Another object of this invention is the provision of an improved nose iron construction which will be of simple and efficient construction, and easily controllable by the thermostat to neutralize expansion and contraction of the load-counterbalancing element.

Other objects and advantages will be apparent from the following description, wherein reference is made to the accompanying drawings illustrating preferred embodiments of our invention, and wherein similar reference numerals designate similar parts throughout the several views.

In the drawings:

Figure 1 is a plan view of the lower portion of such a scale embodying our invention, with the cover and platform-supporting levers and pivots, thermostat and other members housed by the base of the scale.

Figure 2 is a detail longitudinal sectional view taken substantially on the line 2—2 of Figure 1, looking in the direction of the arrows.

Figure 3 is a fragmentary detail plan view of the form of our invention shown in Figure 2 and the portions of the scale mechanism with which it is associated, part of the nose iron channel being broken away to afford a better view of the nose iron.

Figure 4 is a detail sectional view taken substantially on the line 4—4 of Figure 2.

Figure 5 is a view similar to Figure 2 of a modified form of our invention, the parts being shown in the positions they assume when a sufficient load is upon the scale platform to actuate the locking means.

Figure 6 is a fragmentary side view, partly in elevation and partly in section, of a scale embodying this modified form of our improved thermostat and nose iron construction.

Figure 7 is a detail sectional view similar to Figure 5 but showing the positioning of the various parts when no load is on the platform, or a load which is insufficient to actuate the locking means.

Figure 8 is an enlarged detail plan view of the modified embodiment of our invention and the scale members to which it is applied.

Figure 9 is a detail sectional view taken substantially on the line 9—9 of Figure 8.

Figures 10 and 11 are detail perspective views of the locking construction employed in the modified form of our invention to prevent undesired movement of the thermostatically controlled elements.

Referring now to the drawings: The scale constructions here shown are of a well-known form commonly employed with scales of the cylinder type, although the cylinder portions are not shown, and it will be apparent that our invention is easily adaptable to other classes of scales.

Upon the platform 10 are placed objects desired to be weighed. A lever system (which forms no part of this invention) is actuated by the platform, and through the lever 11 movement is transmitted to the load-counterbalancing means and to the indicator. No showing of the indicator actuating means is included, as it forms no part of this invention and would unnecessarily complicate the drawings. The load-counterbalancing means may comprise one or more helical tension springs 12. If two are emmoved, as shown in Figure 1, the upper ends of the springs may be rigidly affixed to a portion of the scale frame, (not shown) while their lower extremities are connected to the nose iron 13, the rearward end of which is carried by the rearward extremity of the lever 11. Their lower ends may be secured to bolts 14', as shown in Figure 3, and a cross-bar 15 may extend across and be connected to both bolts at their lower extremities, carrying a pivot bearing 16 through which the springs may be actuated by the pivot 17 carried by the nose iron, which is in effect an extension of the lever 11.

It will be plain that expansion of the counterbalance springs 12 induced by temperature variations may be neutralized in effect by increasing the effective length of the lever 11, as by outward movement of the nose iron, and vice versa. Accordingly the nose iron is equipped with rollers 18 adjacent its rearward end, to render it relatively freely slidable with respect to the lever 11, in the ribs or ways supplied by the channel member 19, which is rigidly affixed to the end of the lever 11, as best shown in Figures 2, 3, and 4. The thermostat 20 is rigidly supported by the lever 11, as shown in Figures 1 and 2, upon a cross-arm 11ª thereof, and is connected to the nose iron by means of the link 21, the thermostat being arranged to urge the nose iron outwardly upon a rise of temperature, and inwardly when it falls.

In so far as no weighing operation is being performed, the rear extremity of the nose iron 13 rests lightly upon the bottom of the channeled guide 19, and so the action of the thermostat in accordance with temperature changes will be sufficient to overcome such little friction as might arise due to contact with the rear extremity of the nose iron 13 with the floor of the guide 19. But when the scale lever 11 is swung downward to effect a weighing operation, the resistance offered by the load counterbalancing means is materially increased, with the result that the rear extremity of the nose iron 13 is pressed more firmly into engagement with the floor of the guide 19, to thereby increase frictional resistance of the nose iron to any longitudinal movement during such weighing operation. By properly designing the journal of the rollers 18 with respect to the length of the nose iron 13, the additional friction may be so controlled that it will be sufficient to prevent any longitudinal movement of the nose iron through the pulling effect produced by the thermostat while the lever 11 is being swung from one extreme position to the other, though the frictional resistance offered to the longitudinal movement of the nose iron when the scale is not being utilized for weighing operations is so little as not to affect the desired compensating operation of the thermostat. This is believed to be one of the few instances in which friction in a moving scale part is desirable.

In Figures 5 to 11 inclusive we have shown a modified form of our invention, in which positive locking of the nose iron against relative longitudinal movement with respect to its supporting lever is provided, which locking means is so arranged that while no load is on the scale platform, or only a small load, which would not tend to tilt the lever 11 sufficiently at an angle as to endanger the damage of such installation part of the scale post in the guide, the locking members are constantly out of engagement, while whenever a sufficiently heavy load is placed upon the platform to incline the lever at a "dangerous angle" the locking members are forced into positive engagement to prevent any possibility of undesired movement of the nose iron during a weighing operation. In the drawings showing this modified form of locking construction the parts analogous to those previously shown and described in connection with Figures 1 to 4 have been given similar reference numerals with prime exponents.

Adjacent its opposite end from that carrying the pivot 17' the nose iron 13', in the modified construction, carries upon its bottom surface a plate 22, which is formed with a transversely serrated or corrugated surface, as shown in Figures 6, 7, 9, and 10. Secured to the upper surface of the cross-arm 23' of the lever 11', directly below the plate 22, is another plate 24, in substantial alignment therewith, and formed with similar transverse notches or serrations adapted to cooperate with those of the upper plate when the rear end of the nose iron is moved downwardly so that they may engage each other. A load upon the scale platform tends to move the lever 11', channel 19', and consequently the nose iron, downwardly, as indicated by the arrow in Figure 7. The counterbalance springs of course resist this movement, and the resultant is an upward pull through the knife edge pivot upon the outer end of the nose iron, which then fulcrums about the axial pin 18ª upon which the rollers 18' are mounted, and the other end of the cross-arm carrying the plate 22 is urged downwardly until it assumes the position shown in Figure 5, in which the engagement of the notched plates 22—24 locks the nose iron against slidable movement.

Normal downward movement of the rear end of the nose iron which carries the plate 22 under its own weight is yieldably resisted and prevented until a predetermined load has been placed upon the platform by the vertically slidable plunger 25, which is urged upwardly by the spring 26 acting against the transverse pin 27, carried by the plunger. The strength of this spring determines the weight of the load necessary to force the plates 22—24 into engagement. The pin 25 also limits the upward movement of the plunger. The method of forming the housing for the spring 26 and support for the plunger 25 is clearly shown in Figure 9, comprising a plate 28 secured to the under side of the cross-arm 23' of the lever 11', as by means of screws 29. Engagement of the top of the plunger 25 with the upper plate 22, does not limit the free slidability of the plate 22 or the nose iron 13' to which it is attached, as the portion of the plate 22 against which the plunger may engage carries no serrations, but presents a smooth surface, which may be provided by forming a groove 30 therein having a smooth bottom, as shown in Figures 5, 7, 9, and 10. When the downward moment of the end of the nose iron carrying the plate 22 becomes sufficient to force the two plates into engagement, their cooperating notches prevent slidable movement of the nose iron with respect to the lever 11', as explained above, and the operation will be readily understood upon an examination of Figures 5 and 7. As above remarked the purpose of the plunger 25 is to prevent such engagement of the plates 22—24 until the load upon the scale platform reaches a pre-determined point, which is governed by the strength of the spring 26. Thus when no load is on the scale platform, or a load less than that required to force the plates 22—24 together, the nose iron 13' is freely slidable in response to thermostat-induced movement caused by temperature variations, but when the load on the platform becomes so great that the angularity of the lever 11', and consequently the angularity of the pull upon the nose iron through the knife edge pivot 16'—17', might result in longitudinal shifting of the nose iron, this undesirable result is effectively prevented by the engagement of the notched plates. The serrations are preferably made relatively fine, so that they cannot materially disturb the longitudinal relation between the nose iron and the lever when forced together.

While it will be apparent that the illustrated embodiments of our invention herein disclosed are well calculated to adequately fulfill the objects and advantages primarily stated, it is to be understood that the invention is susceptible to variation, modification and change, within the spirit and scope of the subjoined claims.

What we claim is:

1. In a weighing scale having load supporting means, a lever movable proportionately to the load carried thereby, and load counterbalancing means variable in effective resistance to the load with changes of temperature, means for counteracting such variances of the load counterbalancing means, comprising a slidable portion carried by the lever, a thermostat for controlling the sliding thereof proportionately to temperature variances, and means for locking the slidable portion against such movement when sufficient load is placed upon the scale.

2. In a weighing scale incorporating load supporting means, a lever movable in response to the placing of a load thereon, and load counterbalancing means expansible and contractable with variances of temperature, means for neutralizing the effect of such expansion and contraction, comprising a slidable extension carried by the lever, a thermostat controlling the sliding thereof, and means for locking the extension against such slidable movement when the load upon the scale reaches a predetermined point.

3. In a weighing scale incorporating load supporting means, a lever movable in response and proportionately to the load placed thereon, and load counterbalancing means variable in efficiency with variances of temperature, means for neutralizing such variances of efficiency, comprising a thermostat, an effective portion carried by the lever capable of limited independent movement, movable in one direction under control of the thermostat, and proportionately movable in another direction in response to the load placed upon the scale, and means for preventing the thermostat-controlled movement of said portion of the lever when its load-induced movement has attained a predetermined travel.

4. In a weighing scale incorporating load supporting means, a lever movable in response to the load placed thereon, and load counterbalancing means variable in efficiency with variances of temperature, means for neutralizing such variances of efficiency, comprising a thermostat, a quasi-independent section carried by the lever limitedly movable in one line of travel under the influence of the thermostat, and limitedly proportionately movable in a transverse direction in response to the load placed upon the scale, and means for preventing movement in the first mentioned line of travel when the transverse movement has reached a predetermined point.

5. In a weighing scale having load supporting means, a lever movable in response and proportionately to the load placed thereon, and load counterbalancing means variable in efficiency with variances of temperature, means for neutralizing such variances of efficiency, comprising a thermostat, an extension carried by the lever longitudinally slidable by the thermostat to compensate for such temperature variances, and transversely movable in another direction in response to the load placed upon the scale, and means for locking the extension against movement in the first mentioned direction when the transverse movement has reached a predetermined point.

6. In a scale, a lever, a thermostat mounted thereon, an elongated guide member secured upon the lever at a distance from its fulcrum pivot, a pivot carrying a nose iron and a roller adjacent its forward extremity movable within the guide member and of greater diameter than the thickness of the nose iron, whereby the rear extremity of the nose iron slants downwardly into contact with the guide member whenever a sufficient pull is exerted upon the nose iron pivot, and a connection between the nose iron and thermostat.

7. In a scale, a lever, a thermostat mounted thereon, an elongated guide member secured upon the lever at a distance from its fulcrum pivot, a pivot carrying a nose iron and a pair of rollers at the sides of the nose iron adjacent its forward extremity movable within the guide member and of greater diameter than the thickness of the nose iron, whereby the rear extremity of the nose iron slants downwardly into contact with the guide member whenever sufficient pull is exerted upon the nose iron pivot, and a connection between the nose iron and thermostat.

8. In a scale, a lever, a thermostat mounted thereon, an elongated guide member secured upon the lever at a distance from its fulcrum pivot, a pivot carrying a nose iron and a roller adjacent its forward extremity movable within the guide member and of greater diameter than the thickness of the nose iron, whereby the rear extremity of the nose iron slants downwardly into contact with the guide member whenever a sufficient pull is exerted upon the nose iron pivot, a connection between the nose iron and thermostat, and locking means for the nose iron operable upon such contact between its rear extremity and the guide member.

9. In a scale, a lever, a thermostat mounted thereon, an elongated guide member secured upon the lever at a distance from its fulcrum pivot, a pivot carrying a nose iron and a pair of rollers at the sides of the nose iron adjacent its forward extremity movable within the guide member and of greater diameter than the thickness of the nose iron, whereby the rear extremity of the nose iron, slants downwardly into contact with the guide member whenever sufficient pull is exerted upon the nose iron pivot, a connection between the nose iron and thermostat, and locking members carried by the rear extremity of the nose iron and the adjacent portion of the guide member, engageable when contact is established between them by such a sufficient pull upon the nose iron pivot.

10. In a weighing scale having load supporting means, a lever movable in response and proportionately to the load placed thereon, an elongated guide member secured upon the lever at a distance from its fulcrum pivot, a nose iron smaller in cross section than the interior of the guide member, a pivot carried by the nose iron within the guide member, and a roller mounted thereon of greater diameter than the thickness of the nose iron, whereby the nose iron is longitudinally movable in the guide member, and can pivot about the roller-carrying fulcrum until its rear extremity contacts the guide member whenever a sufficient load is placed upon the scale, a thermostat connected to the nose iron to control longitudinal movement thereof, and locking members carried by the contacting surfaces of the nose iron and guide member to prevent longitudinal movement of the nose iron after such contact is established.

11. In a weighing scale including load-counterbalancing means, a lever member and a connecting member, means for varying the effective size of one of said members to compensate for temperature-induced variations of the characteristics of the load-counterbalancing means, comprising a slidable member, a thermostat for normally controllingly sliding the slidable member, and locking means for restricting movement of the slidable member when a sufficient load is on the scale.

12. In a weighing scale including load-counterbalancing means, a lever member and a connecting member, means for varying the effective size of one of said members to compensate for temperature-induced variations of the characteristics of the load-counterbalancing means, comprising a slidable member, a thermostat for normally controllingly sliding the slidable member, and locking means for restricting movement of the slidable member when a sufficient load is on the scale, including a laterally movable portion appurtenant the slidable member.

WALTER F. STIMPSON.
WILLIS E. FINCH.